US006164261A

United States Patent [19]

Kruse

[11] Patent Number: 6,164,261

[45] Date of Patent: Dec. 26, 2000

[54] INTERNAL COMBUSTION ENGINE PISTON ASSEMBLY AND METHOD

[75] Inventor: Brian K. Kruse, Lafayette, Ind.

[73] Assignee: Caterpillar Inc., Peoria, Ill.

[21] Appl. No.: 09/247,669

[22] Filed: Feb. 10, 1999

[51] Int. Cl.[7] .......... F16J 1/04

[52] U.S. Cl. .......... 123/193.6

[58] Field of Search .......... 123/193.6; 92/220, 92/221

[56] References Cited

U.S. PATENT DOCUMENTS

| | | | |
|---|---|---|---|
| 2,104,347 | 1/1938 | Larkin | 92/220 |
| 2,739,854 | 3/1956 | Maybach | 92/221 |
| 2,743,143 | 4/1956 | Maybach | 92/221 |
| 4,044,731 | 8/1977 | Lindner | 92/220 |
| 4,114,519 | 9/1978 | Speaight | 92/221 |
| 4,185,544 | 1/1980 | Kolar | 92/220 |
| 4,614,150 | 9/1986 | Deutschmann | 92/221 |

*Primary Examiner*—Marguerite McMahon

*Attorney, Agent, or Firm*—James B. Golden; Alan J. Hickman

[57] ABSTRACT

A piston assembly for an internal combustion engine comprising an upper piston member, a piston skirt, and an insert which is fastened together. The insert is tapered and urges the piston skirt towards the upper piston member. The principle use is for light weight pistons having a skirt made of a lighter weight material, however any two piece piston assembly will benefit from this invention.

21 Claims, 3 Drawing Sheets

INTERNAL COMBUSTION ENGINE PISTON ASSEMBLY AND METHOD

TECHNICAL FIELD

This invention relates generally to a piston assembly for an internal combustion engine, and more particularly to a method of fastening an upper piston member to a piston skirt.

BACKGROUND ART

Engines are constantly being modified to increase power output. The increase in power output of engines often subjects piston assemblies to higher combustion chamber pressures and temperatures. It is for that reason that emphasis has been placed over the past several years on finding new and economical designs for manufacturing a piston assembly capable of withstanding these higher combustion chamber pressures and temperatures.

The goal of the prior art piston assemblies was to provide economical piston assemblies by reducing excessive weight and limiting structural components. The prior art piston assemblies included a two piece piston assembly with a wrist pin attached to an upper piston member, resulting in a simplified skirt or crown geometry, and improved manufacturability. However, the wrist pin is attached to the piston member by extending a bolt through the wrist pin and into the upper piston member on opposing sides of the connecting rod. Due to the high combustion pressures experienced during operation of present day engines, the bolting pattern and loading design of the prior art allows the wrist pin to flex about the central axis of the piston assembly causing failure of the design. Required bolt access on the piston underside also limits the connecting rod bearing length, and thereby, piston load capacity.

Several problems, one of which is the height of piston assemblies may increase the overall engine height and cost of the engine. Engines that operate using a piston assembly usually have an upper piston member made of a material, such as cast iron or steel that can withstand the thermal and mechanical stresses that occur during engine operation. The piston skirt is usually made of lighter weight material, such as aluminum or an aluminum alloy to help reduce the weight of the piston assembly. Connecting the piston skirt to the piston crown is typically accomplished using threaded fasteners. Stiffness of the piston assembly, in particular, at the bearing surface and around the fastener is characteristic of the material of the upper piston member and piston skirt. Stiffness is a function of the materials modulus of elasticity, length, and cross sectional area. Piston skirts made of lighter materials may require a greater piston skirt height in order to provide an adequate stiffness ratio between the bearing surface and the fastener and to maintain proper operational characteristics of the piston assembly. The increased piston skirt height leads to an undesirable increase in the height of the engine block, cylinder liner, and other components. This results in an increase in the cost of the piston assembly and related engine components increase in manufacturing cost is due, in particular, the engine block that needs to be lengthened to accommodate the piston assembly.

Wear often occurs at the joint interface between the upper piston member and piston skirt at the outer portion of the bearing surface and around the fasteners. Bearing surface wear is due to radial and axial movements of the bearing surface. Fastener wear is due to radial and axial movements of the bearing surface of the upper piston member and piston skirt, which surfaces contact each other. These movements are caused by the warping action caused by the deformation of the upper part of the piston owing to the combustion chamber pressure and resulting not only in wear but also the risk of a plastic deformation of the piston skirt with a subsequent cracking and shearing of material. Additionally, the plastic deformation causes the upper piston member and piston skirt to approach each other so that the tension of the fasteners are reduced.

The present invention is directed to overcoming one or more of the problems set forth above.

DISCLOSURE OF THE INVENTION

In one aspect of the present invention, a piston assembly for an internal combustion engine has an upper piston member, a piston skirt, an insert, and a fastener. The upper piston member has a connection receiving bore. The piston skirt has an insert receiving bore. The insert has a fastener receiving bore. The insert is disposed in the insert receiving bore. The fastener is disposed in the fastener receiving and the connection receiving bores. The fastener urges the piston skirt and the upper piston member towards each other.

In another aspect of the present invention, a piston assembly for an internal combustion engine has an upper piston member, a piston skirt, an insert which is tapered, and a fastener. The upper piston member has a connection receiving bore. The piston skirt has an insert receiving bore which is tapered. The insert has a fastener receiving bore. The insert is disposed in the insert receiving bore. The fastener is positioned in the fastener receiving and connection receiving bores and urges the piston insert towards the upper piston member.

In yet another aspect of the present invention, a method of assembling a piston having an upper piston member, a piston skirt, an insert, and a fastener. The upper piston member has a connection receiving bore. The piston skirt has an insert receiving bore. The insert has a fastener receiving bore. The method includes the steps of placing the insert into the insert receiving bore. Engaging the piston skirt with the upper piston member. Disposing the fastener in the disc positioning bore, the fastener receiving bore, and the connection receiving bore. Tightening the fastener, and urging the piston insert towards the upper piston member.

BEST MODE FOR CARRYING OUT THE INVENTION

Figure 1:
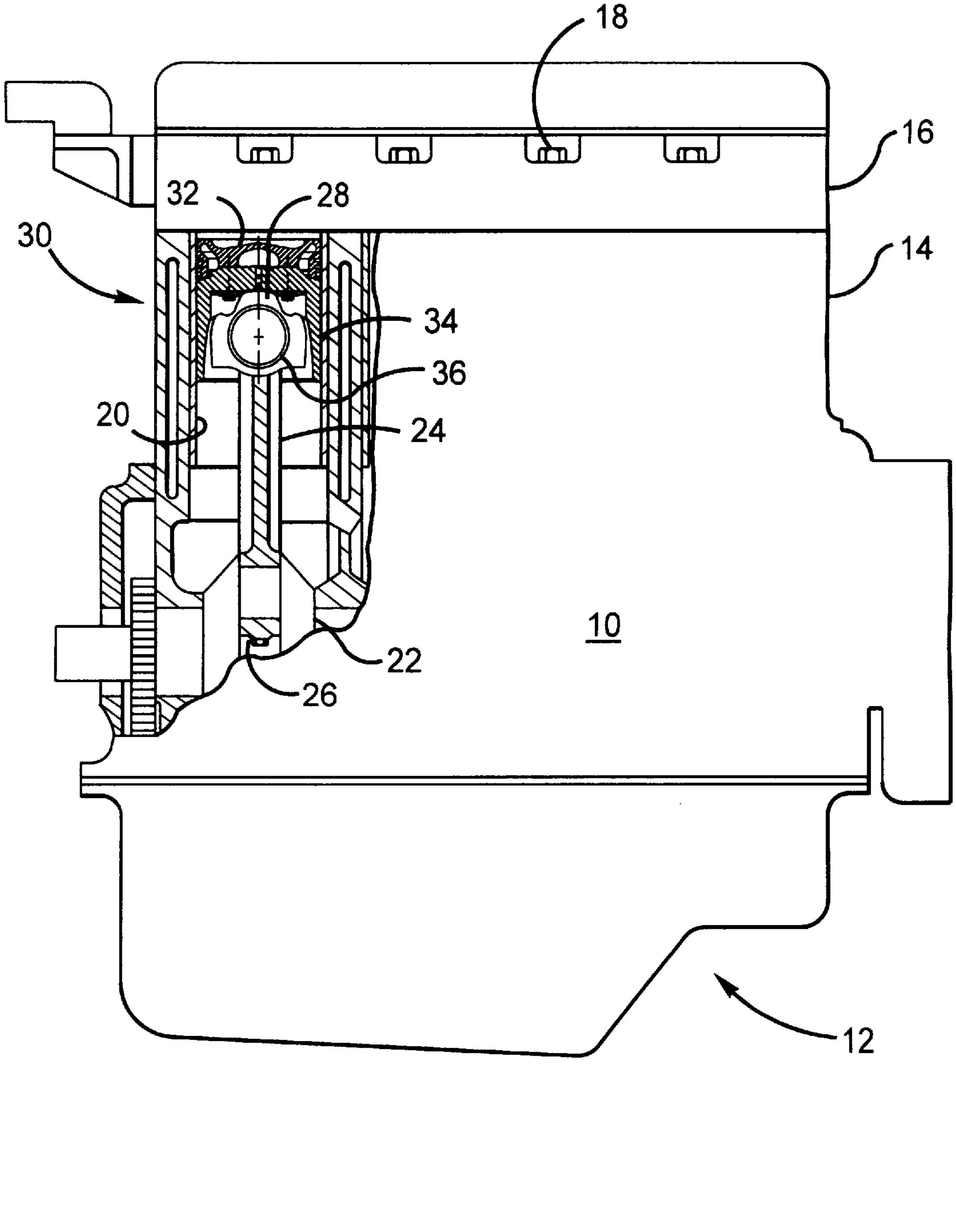
FIG. 1 is a diagrammatic side view of an internal combustion engine with portions broken away showing an embodiment of a piston assembly of the present invention.
Figure 2:
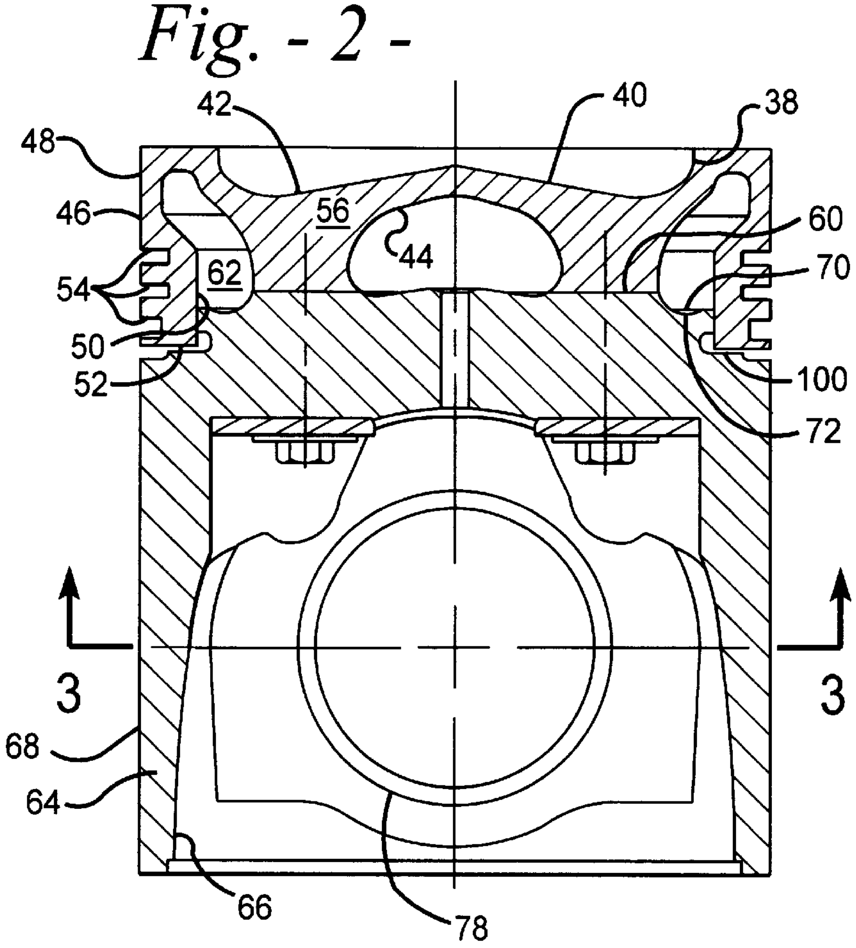
FIG. 2 is a diagrammatic cross sectional view of the piston assembly of FIG. 1.

Referring to FIG. 1, an internal combustion engine 10 includes a conventional lubricating system 12, a block 14 and a cylinder head 16 rigidly secured to the block 14 by a plurality of fasteners or bolts 18 in a conventional manner. The block 14 includes a plurality of replaceable cylinder liners 20 therein, only one of which is shown. The block 14 could include a plurality of machined cylinder bores without departing from the invention. The engine 10 further includes a crankshaft 22 rotatably positioned therein in a conventional manner. A connecting rod 24 is rotatably attached to the crankshaft 22 at a split end 26 in a conventional manner. An upper eye end 28 of the connecting rod 24 is attached to a piston assembly 30 in a conventional manner. The piston assembly 30, as best shown in FIG. 2, includes an upper piston member 32, and a lower piston skirt 34 which is pivotally mounted on a common wrist pin 36, in a conventional manner.

The upper piston member 32 includes a main body 38 having a generally cylindrical configuration. The upper piston member 32 is made of a material that can withstand combustion pressures and temperatures, such as steel, iron, ceramic, or the like. The main body 38 includes a crown 40 having a top surface 42 and a bottom surface 44. A relatively short, generally cylindrical tubular member 46 depends away from the top surface 42 at the extremity of the crown 40. The tubular member 46 is defined by an outer surface 48, an inner surface 50 and a bottom portion 52. Defined in the outer surface 48 is a pair of peripheral grooves 54 for receipt of a pair of compression rings and a further peripheral groove 54 for receipt of a conventional oil ring. A strut portion 56 of the upper piston member 32 has a threaded connection receiving bore 58 disposed therein. The strut portion 56 also interconnects the mounting surface 60 with upper piston member 32. The contour of the mounting surface 60 has a configuration to abut a corresponding contour configuration on the upper piston member 32. For example, the mounting surface 60 in this application has a generally flat configuration, but as an alternative could be generally part circular or any configuration which would correspond to the contour of the upper piston member 32 being used. Interposed between the tubular member 46 and the strut portions 56 and at least a portion of the bottom surface 44 of the crown 40 is a cavity 62. The cavity 62 is defined by the inner surface 50 of the tubular member 46 and a portion of the strut portion 56.

The lower piston skirt 34 includes a generally elliptical member 64 having an inner side wall surface 66 and an outer side wall surface 68. The piston skirt 34 is made of a material that will lighten the weight of the piston assembly 30, such as aluminum, aluminum alloys, or the like. An upper end 70 of the elliptical member 64 has an annular groove 72 positioned therein which opens upwardly toward the bottom portion 52 of the tubular member 46. An insert receiving bore 74 which is disposed in the piston skirt 34 has a longitudinal axis 75. The insert receiving bore 74 has a converging tapered contour extending towards the bottom portion 52 of the upper piston member 32. The insert receiving bore 74 is for placing an insert 76 in the piston skirt 34. However, different counters for the insert receiving bore 74 may be used without departing from the spirit of the invention. For example, a spherical contour may be used in cooperation with the insert 76 or a threaded contour may be used in cooperation with insert 76. The insert 76 will be discussed in more detail below. The piston skirt 34 has an end opposite of the tubular member 76 that provides a gap between a bottom portion 78 of the upper piston member and the piston skirt 34.

Figure 3:
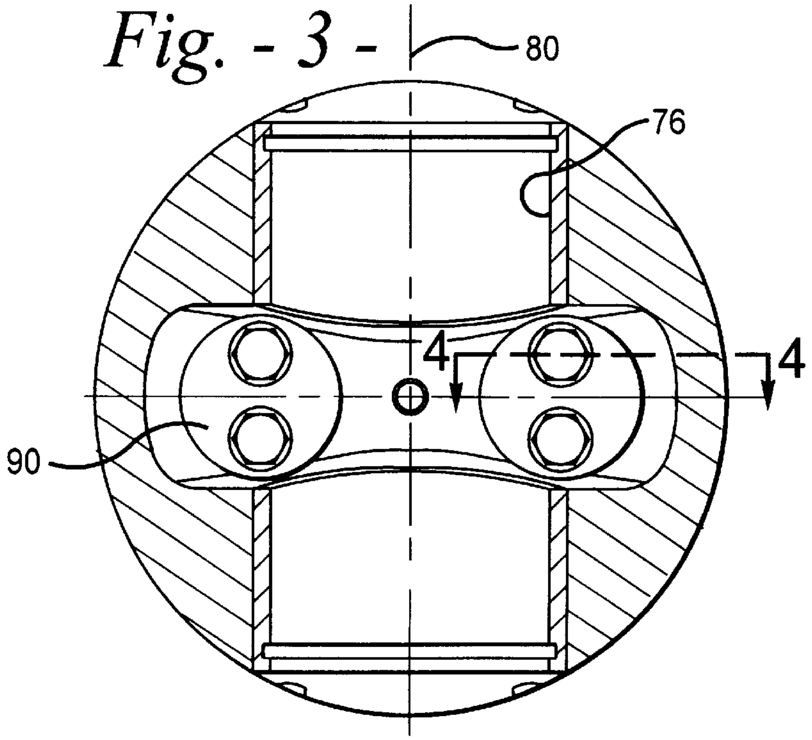
FIG. 3 is a diagrammatic bottom view taken along lines 3—3 of FIG. 2.

As seen in FIG. 3, A pair of coaxially aligned bores 79 extends through the skirt 34 between the inner side wall surface 66 and the outer side wall surface 68. The wrist pin 36 is positioned within the pair of bores 79. Positioning of the wrist pin 36, in this application, includes the relative close fit between the inner side wall surface 66. As an alternative a conventional snap ring and groove could be positioned in the inner surface 66. As an alternative, the skirt 34 could be generally cylindrical without departing from the spirit of the invention. The wrist pin 36, in this application, has a hollow substantially cylindrical configuration being centered about an transverse axis 80. The wrist pin 36 could, as an alternative, be of a solid rod configuration without departing from the spirit of the invention.

Figure 4:
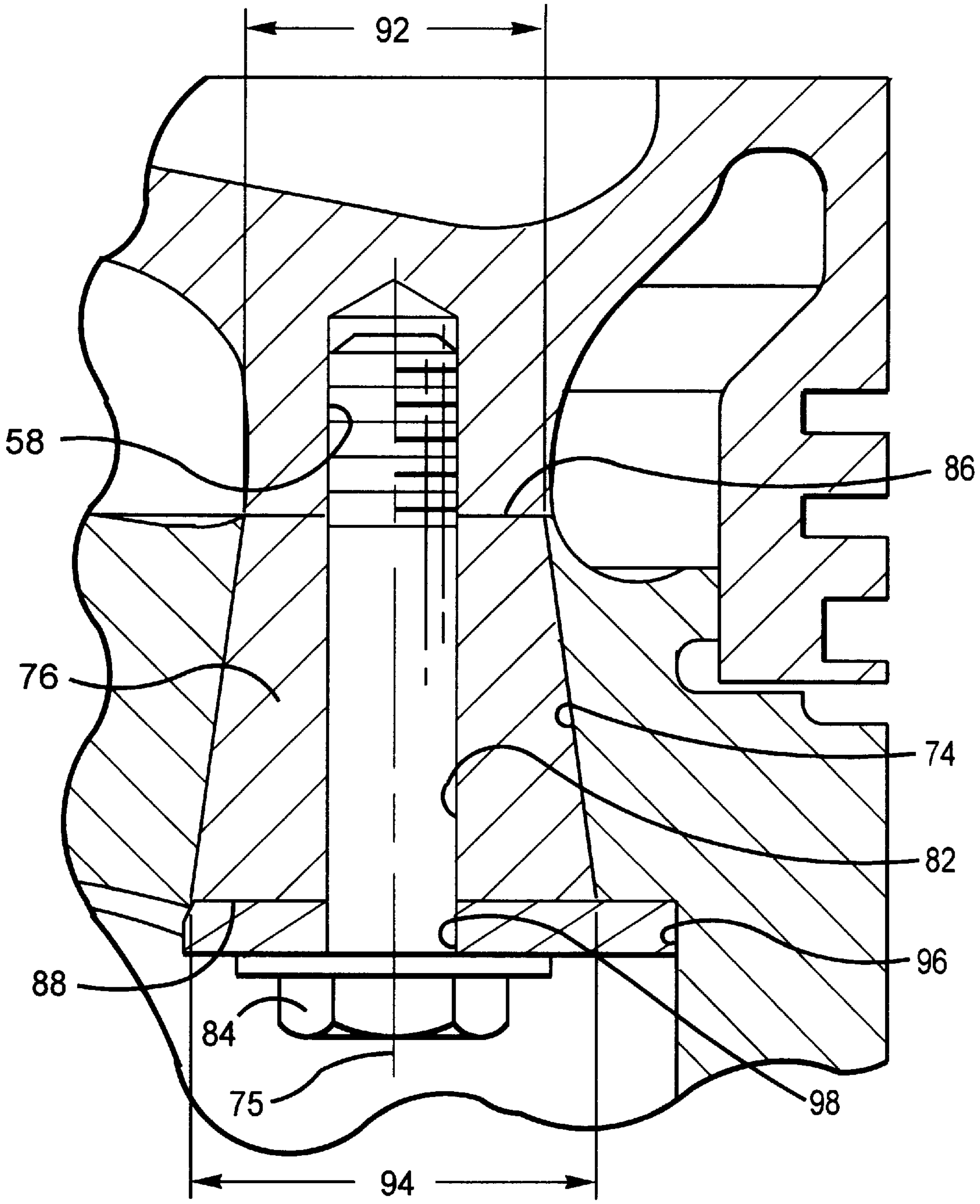
FIG. 4 is a diagrammatic partial cross sectional view taken along lines 4—4 of FIG. 3.

As seen in FIG. 4, the piston assembly 30 includes the insert 76. The insert 76 is disposed in the insert receiving bore 74 and also has a fastener receiving bore 82 disposed therein. The insert 76 is made of a material that provides adequate stiffness for joining the piston skirt 34 to the upper piston member 32, such as steel, cast iron, or a like. The insert 76 is typically made of the same material as the upper piston member 32. However, dissimilar materials may be used for the insert 76 and the upper piston member 32 without departing from the spirit of the invention. The contour of the insert 76 is tapered to match the insert receiving bore 74 of the piston skirt 34 as discussed above. The fastener receiving bore 82 is in alignment with the threaded connection receiving bore 58 and allows fasteners 84, such as cap screws to extend through the insert 76 into the threaded connection receiving bore 58. The insert 76 has a crown engaging end 86 that is adjacent to the piston crown 40 and a fastener engaging end 88 that is adjacent to a disc 90. The crown engaging and fastener engaging ends 86, 88 have a circular cross section taken along a plane parallel to the transverse axis 80. Tightening of the fasteners 84 engages the crown engaging end 86 of the insert 76 with the upper piston member 32. Engagement of the crown engaging end 86 with the upper piston member 32 generally deforms the piston skirt 34 at the engaged portion 91 between the upper piston member 32 and the piston skirt 34. Other applications may minimize the piston skirt 34 deformation by providing a space between the crown engaging end 86 and the upper piston member 32. The crown engaging end 86 has a first diameter 92 and the fastener engaging end 88 has a second diameter 94. The first diameter 92 is less in magnitude than the second diameter 94 thereby providing the taper to the insert 76. Applications may have the disc 90 disposed between the fastener 84 and the piston skirt 34. In this application, the disc 90 is piloted in the piston skirt 34 in a disc receiving counterbore 96. It should be understood that other applications may have a piston assembly 30 without the use of the disc 90 without departing from the spirit of the invention. The disc 90, typically a metal disc 90, such as a washer has a plurality of fastener positioning bores 98 corresponding with the fastener receiving bore 82 and the threaded connection receiving bore 58. The piston skirt 34 has the transverse axis 80 in which the plurality of fastener positioning bores 98 are spaced from. This application has the plurality of fastener receiving bores 98 spaced equally from the transverse axis 80. Other applications however, may have the fastener receiving bore 98 centered on the transverse axis 80 or at different spaced intervals without departing from the spirit of the invention. The disc 90 adds additional stiffness to the fastened joint between the insert 76, piston skirt 34, and upper piston member 32. Tightening of the fasteners 84 generally urges the piston skirt 34 towards the upper piston member 32 and forcibly engages a surface 99 of the insert receiving bore 74 and the insert 76. Additional tightening of the fasteners 84 engages the insert 76, the piston skirt 34, with the upper piston member 32. The engagement of the piston skirt 34 with the upper piston member 32 is generally by deformation of the piston skirt 32. However, other applications may have a space between the insert 76 and the upper piston member 32 to minimize the deformation of the piston skirt 32. The upper piston member 32 is piloted in a tubular member counterbore 100 of the piston skirt 34. It is to be recognized however, that piston assemblies 30 may provide a gap between the tubular member 46 and the tubular member counterbore 100 without departing from the spirit of the invention.

Industrial Applicability

In this specific example, the main body 38 of the piston assembly 30 is placed on a table or work area with the top surface 42 of the crown 40 in contact with the table. The compression rings are assembled in the respective one of the pair of peripheral grooves 54 in the crown 40 and the oil ring is assembled in the peripheral groove 54. The piston insert 76 is inserted into the insert receiving bore 74 of the piston skirt 34. The piston skirt 34 is positioned such that the upper end 70 is contacting the strut portion 56 of upper piston member 32. The piston skirt 34 has the tubular member counterbore 100 which pilots the upper piston member 32 with the piston skirt 34. The disc 90 is positioned in the piston skirt 34. The disc 90 is disposed in the piston skirt 34. Typically this is accomplished by piloting the disc 90 in the disc receiving counterbore 96 of the piston skirt 34. The fasteners 84 are disposed into each of the plurality of fastener positioning bores 98, fastener receiving bores 82, and the threaded connection receiving bores 58. The fasteners 84 are then tightened urging the piston skirt 34 towards the upper piston member 32. The urging also forcibly engages the surface 99 of the insert receiving bore 74 with the insert 76. The insert 76 centers the piston skirt 34 with the upper piston member 32 during tightening of the fasteners 84. The piston skirt 34 is generally deformed from tightening the fastener 84. Tightening of the fastener 84 generally engages the upper piston member 32 with the insert 76. However, other applications may provide a gap between the upper piston member 32 and the piston skirt 34 thereby minimizing deformation of the piston skirt 34. The connecting rod upper eye end 28 is positioned with the pair of coaxially aligned bores 79 in the skirt 34 and the wrist pin 36 is inserted through one of the bores 79 in the piston skirt 34.

After having assembled the piston assembly 30 and the connecting rod 24, the combination is inserted into the bore 79 in a conventional manner, such as inserting the connecting rod 24 into the bore 79 and using a ring compressor to compress the rings allowing the piston assembly 30 to be inserted into the bore 79. Thus, the split end 26 of the connecting rod 24 can be rotatably attached to the crankshaft 22.

In operation, the engine 10 is operated and during the power stroke the major force, which is developed during combustion or the power stroke, is applied to the top surface 42 of each of the piston assemblies 30. The load or force results in compressive loads or forces being transmitted from the top surface 42 through the crown 40 into the strut portion 56 to the mounting surface 60. From the mounting surface 60, the force is transmitted to the to the insert 76, the piston skirt 34 and into the wrist pin 36. The force from the wrist pin 36 is transferred to the connecting rod 24 in a conventional manner and results in the rotation of the crankshaft 22.

During the exhaust stroke of the engine, a lower secondary force results in compressive loads or forces being transmitted from the crankshaft 22 through the connecting rod 24 to move the top surface 42 of the crown 40 toward the head 16 wherein combusted gases are evacuated from the bore in a conventional manner. The force from the crankshaft 22 is transferred through the connecting rod 24 into the piston skirt 34, into the insert 76 and into the mounting surface 60. The force is further transmitted through the strut portion 56 and into the bottom surface of the crown 44. Thus, the combusted gases are exhausted.

During the portion of the operation of the engine 10 commonly referred to as the intake stroke which occurs in functional order after the exhaust stroke, as the top surface 42 reaches its position nearest to the head 16, the crankshaft 22 rotationally reverses the forces applied to the piston assembly 30 resulting in tension forces or loads being resisted by the components. For example, as the crankshaft 22 rotates the connecting rod 24 is pulled or moved away from the head 16 and the forces attempt to pull or separate the contact of the upper piston member 32 from the mounting surface 60 of the piston member 32. Thus, the fasteners 84 and the threaded connection receiving bores 58 must resist the loads or forces during the intake stroke. Additionally, further forces are attempting to separate the contact of the upper piston member 32 from the mounting surface 60 of the piston skirt 34. For example, as defined above, at the point where the piston assembly 30 has moved upwardly toward the head 16 and changes direction and begins to move away from the head 16, the inertia forces within the piston assembly 30 further apply a tension force to the fasteners 84 and the threaded connection receiving bores 58. Thus, the lighter the construction of the piston assembly 30, the lower the inertia and the greater the dependability of the piston assembly 30.

The piston assembly 30 of the present invention has a reduced weight with using a lighter weight piston skirt 34. Having a piston assembly 30 that is of lighter weight reduces the inertia forces acting on the piston assembly 30 during operation. The reduction of inertia forces improves the durability and operation of the piston assembly 30. In addition, having the piston skirt 34 fastened to the upper piston member 32 using the insert 76 permits the piston assembly 30 to achieve desired operational characteristics while also reducing the height of the piston assembly 30. The reduced height of the piston assembly 30 permits engineers to design engines 10 with similar height while improving engine 10 performance or even a lowering height of cylinder block 14. The height of the cylinder block 14, in large part determines the size of the engine compartment. Reducing the engine compartment size or maintaining current engine compartment size may permit additional components to be added to the engine 10 to increase the benefit to the customers, such as alternators, filters, improved cooling systems, and the like. The reduction in the height of the cylinder block 14 also reduces the cost of manufacturing the cylinder block 14 and engine 10. Fastening the piston skirt 34 with the upper piston member 32 using the insert 76 improves the wear characteristics of the piston assembly 30. Wear typically occurs in the mounting surface 60, in particular the crown engaging end 86 of the insert 76 and also around the fasteners 84. Piston assemblies 30 using the insert 76 provide a steel on steel material contact in the mounting surface 60 which typically has the highest stress concentration and also around the fasteners 84. This material contact reduces wear and plastic deformation that is typically a characteristic of having the piston skirt 34 made of the lighter weight material.

Other aspects, objects and advantages of this invention can be obtained from a study of the drawings, the disclosure and the appended claims.

What is claimed is:

1. A piston assembly for an internal combustion engine, comprising:

an upper piston member having a threaded connection receiving bore disposed therein;

a piston skirt having an insert receiving bore disposed therein;

an insert having a fastener receiving bore disposed therein, said insert being disposed in the insert receiving bore; and a fastener being substantially disposed in the fastener receiving bore and the threaded connection receiving bore and urging the piston skirt and the upper piston member towards each other.

2. A piston assembly, as set forth in claim 1, wherein said upper piston member and insert being made of dissimilar materials.

3. A piston assembly, as set forth in claim 2, wherein said upper piston member and insert being made of a steel material, and said piston skirt being made of an aluminum alloy, said steel material providing adequate stiffness between said piston insert and a piston crown.

4. A piston assembly, as set forth in claim 1, wherein said fastener forcibly urging said insert into engagement with said upper piston member and providing a steel on steel material contact at a juncture of engagement between said upper piston member and said insert.

5. A piston assembly, as set forth in claim 1, wherein said insert receiving bore and said insert being in screw threaded engagement.

6. A piston assembly, as set forth in claim 1, including a disc wherein said piston skirt has a disc receiving counterbore for piloting the disc relative to said piston skirt.

7. A piston assembly, as set forth in claim 6, wherein said piston skirt has a transverse axis and said disc has a plurality of fastener positioning bores equally spaced from the transverse axis.

8. A piston assembly, as set forth in claim 1, wherein said piston skirt has a tubular member counterbore for piloting said upper piston member relative to said piston skirt.

9. A piston assembly, as set forth in claim 8, wherein a gap is provided between a bottom portion of a tubular member and an end of a piston skirt.

10. A piston assembly for an internal combustion engine, comprising:

an upper piston member having a threaded connection receiving bore disposed therein;

a piston skirt having an insert receiving bore disposed therein;

an insert having a fastener receiving bore disposed therein, said insert being disposed in the insert receiving bore, said insert receiving bore and said insert each being tapered and in engagement with each other; and a fastener being disposed in the fastener receiving bore and the threaded connection receiving bore and urging the piston skirt and the upper piston member towards each other.

11. A piston assembly for an internal combustion engine, comprising:

an upper piston member having a threaded connection receiving bore disposed therein;

a piston skirt having an insert receiving bore disposed therein and said insert receiving bore being tapered;

an insert having a fastener receiving bore disposed therein, said insert being tapered, said insert being disposed in the insert receiving bore; and a fastener being positioned in the fastener receiving and threaded connection receiving bores, said fastener urging said piston skirt towards said upper piston member and maintaining contact between said piston skirt and said upper piston member.

12. A piston assembly, as set forth in claim 11, wherein the urging of the insert towards the upper piston member causes forcible engagement between said insert and a surface of the insert receiving bore.

13. A piston assembly, as set forth in claim 12, wherein said insert includes a crown engaging end and a fastener engaging end, each of said crown engaging and fastener engaging ends having a circular cross section taken along a plane being parallel to the transverse axis.

14. A piston assembly, as set forth in claim 13, wherein said piston skirt has a disc receiving counterbore for piloting a disc in said piston skirt.

15. A piston assembly, as set forth in claim 14, wherein said crown engaging end has a first diameter and said fastener engaging end has a second diameter, said first diameter being less in magnitude than said second diameter.

16. A piston assembly, as set forth in claim 11, wherein said insert receiving bore and said insert being in screw threaded engagement with said upper piston member.

17. A piston assembly, as set forth in claim 11, wherein said fastener is adjustable and selectively provides forcibly urging engagement between the upper piston member and said piston skirt.

18. A piston assembly, as set forth in claim 11, wherein said insert deforms said piston skirt at an engaged portion of the insert and the upper piston member.

19. A method of assembling a piston having an upper piston member, a piston skirt, an insert, and a fastener, said upper piston member having a threaded connection receiving bore, said piston skirt having an insert receiving bore, and said insert having a fastener receiving bore, comprising the step(s) of:

placing said insert into said insert receiving bore;

engaging said piston skirt with said upper piston member;

positioning said fastener in said fastener receiving bore and said threaded connection receiving bore;

tightening said fastener and urging said piston insert towards said upper piston member; and deforming said piston skirt at an engaged portion between the insert and the upper piston member.

20. A method, as set forth in claim 19, wherein said piston skirt has a tubular portion receiving counterbore and including the step of piloting said upper piston member on said tubular member receiving counterbore.

21. A method of assembling a piston having an upper piston member, a piston skirt, an insert, a disc, and a fastener, said upper piston member having a threaded connection receiving bore, said piston skirt having an insert receiving bore and a disc receiving counterbore, said insert having a fastener receiving bore, and said disc having a fastener positioning bore, comprising the step(s) of:

placing said insert into said insert receiving bore;

engaging said piston skirt with said upper piston member;

piloting said disc in said disc receiving counterbore;

positioning said fastener in said fastener receiving bore and said threaded connection receiving bore;

tightening said fastener and urging said piston insert towards said upper piston member; and deforming said piston skirt at an engaged portion between the insert and the upper piston member.

* * * * *